(12) United States Patent
Chinatalapalli Patta et al.

(10) Patent No.: US 10,265,865 B2
(45) Date of Patent: Apr. 23, 2019

(54) ADAPTIVE GRIPPER DEVICE

(71) Applicant: Tata Consultancy Services Limited, Mumbai (IN)

(72) Inventors: Venkat Raju Chinatalapalli Patta, Bangalore (IN); Swagat Kumar, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 55 days.

(21) Appl. No.: 15/419,475

(22) Filed: Jan. 30, 2017

(65) Prior Publication Data
US 2017/0368693 A1 Dec. 28, 2017

(30) Foreign Application Priority Data
Jun. 28, 2016 (IN) .............................. 201621022136

(51) Int. Cl.
*B25J 15/06* (2006.01)
*B25J 9/16* (2006.01)
(Continued)

(52) U.S. Cl.
CPC ......... *B25J 15/0616* (2013.01); *B25J 9/1612* (2013.01); *B25J 9/1669* (2013.01);
(Continued)

(58) Field of Classification Search
CPC ................ B25J 15/0293; B25J 15/0028; B25J 15/0038; B25J 15/0052; B25J 15/0061;
(Continued)

(56) References Cited

U.S. PATENT DOCUMENTS 5,609,377 A * 3/1997 Tanaka ................. B65G 47/918
294/65
6,652,014 B2 * 11/2003 Schmalz ................ B65G 47/91
294/65
(Continued)

FOREIGN PATENT DOCUMENTS

FR 320303 A * 12/1902 ............. A01B 31/00
JP H07206211 A * 8/1995
JP 2001239484 A * 9/2001

OTHER PUBLICATIONS

Kenji, English translation for reference JPH07206211A (Year: 1995).*
(Continued)

*Primary Examiner* — Rachid Bendidi
(74) *Attorney, Agent, or Firm* — Finnegan, Henderson, Farabow, Garrett & Dunner LLP (57) ABSTRACT

A gripper device and method is provided. The method includes capturing, using an electronic device, information of an object that is indicative of holding position; determining, using the information, by a hardware processor, an optimal holding orientation and an optimal movement of at least one of (i) a plurality of fingers, or (ii) a plurality of suction cups of a gripper device; identifying the at least one of (i) the plurality of fingers, and (ii) the plurality of suction cups as one or more grasping components based on the information, the optimal holding orientation and the optimal movement; and enabling, using an actuator, the one or more identified grasping components to grasp the object based on the information, the optimal holding orientation and the optimal movement.

4 Claims, 6 Drawing Sheets

(51) Int. Cl.
    *B25J 15/00*       (2006.01)
    *B25J 15/02*       (2006.01)
    *B25J 19/02*       (2006.01)

(52) U.S. Cl.
    CPC ......... *B25J 9/1697* (2013.01); *B25J 15/0028* (2013.01); *B25J 15/0038* (2013.01); *B25J 15/0052* (2013.01); *B25J 15/0061* (2013.01); *B25J 15/0253* (2013.01); *B25J 15/0293* (2013.01); *B25J 19/021* (2013.01); *G05B 2219/39543* (2013.01)

(58) Field of Classification Search
    CPC .... B25J 15/0253; B25J 15/0616; B25J 9/021; B25J 9/1612; B25J 9/1669; B25J 9/1697
    See application file for complete search history.

(56) References Cited

U.S. PATENT DOCUMENTS

| | | | |
|---|---|---|---|
| 7,677,622 B2 * | 3/2010 | Dunkmann | B65G 47/917 294/188 |
| 7,798,546 B2 * | 9/2010 | Kniss | B25J 15/0052 294/65 |
| 9,205,558 B1 | 12/2015 | Zevenbergen et al. | |
| 9,352,867 B2 | 5/2016 | Actis | |
| 2001/0045755 A1 | 11/2001 | Schick et al. | |

OTHER PUBLICATIONS

Masataka, English translation for reference JP2001239484A, (Year: 2001).*

* cited by examiner

ADAPTIVE GRIPPER DEVICE

PRIORITY CLAIM

This U.S. patent application claims priority under 35 U.S.C. § 119 to: India Application No. 201621022136, filed on Jun. 28, 2016. The entire contents of the aforementioned application are incorporated herein by reference.

TECHNICAL FIELD

The disclosure herein generally relate to gripping mechanisms, and, more particularly, to an adaptive gripper device.

BACKGROUND

Gripping systems enable gripping of objects. Current gripping system have fingers driven by actuators, in which the gripping system pick objects which are in gripping range. The problem in the current gripping systems is that they do not have much intelligence to estimate the object picking positions and holding positions, and have restrictions where the fingers hold the objects which are having height. For example holding a book with two fingers which is placed on the floor is much difficult as the book border does not have much space to grip at the edges. In order to hold such objects, the dimensions of the object should be within the range of gripping components. Other types of gripping systems are vacuum cups based which pick and place objects where they can handle multi-dimensional objects. However, these types of vacuum cups based gripping systems heavily depend on surface of objects. For example, such vacuum cups based gripping systems would require the surface of the objects to be flat or smooth enough to use vacuum cups, and cannot handle the rough surfaced or multi vertex shaped objects.

SUMMARY

Embodiments of the present disclosure present technological improvements as solutions to one or more of the above-mentioned technical problems recognized by the inventors in conventional systems. For example, in one aspect, a gripper device is provided. The gripper device comprises a base comprising a first end and a second end; a plurality of fingers, wherein a fixed finger comprising a top end and a bottom end, wherein the bottom end of the fixed finger is coupled to the first end of the base, a sliding finger comprising a top end and a bottom end, wherein the bottom end of the sliding finger is positioned at the second end of the base and opposite to the fixed finger; a plurality of suction cups, wherein a first suction cup is attached to the fixed finger such that the first suction cup is in close proximity of the top end of the fixed finger, wherein a second suction cup is attached to the fixed finger such that the second suction cup is in close proximity of the bottom end of the fixed finger, and wherein a third suction cup is attached between the first end and the second end of the sliding finger; an electronic device that is configured to capture information of an object to be grasped, wherein the information is indicative of holding position of the object; and a hardware processor is configured to determine an optimal holding orientation and an optimal movement of at least one of (i) the plurality of fingers, or (ii) the plurality of suction cups based on the captured information obtained from the electronic device, and identify the at least one of (i) the plurality of fingers, or (ii) the plurality of suction cups as one or more optimal grasping components based on the information on the object, the determined optimal holding orientation and the determined optimal movement.

In one embodiment, the gripper device may further comprise one or more proximity sensors configured to detect position of the object from the plurality of fingers. In one embodiment the sliding finger is configured to move from a first position to a second position based on position and dimension of the object. In one embodiment, the gripper device may further comprise an actuator that is configured to enable the one or more optimal grasping components to grasp the object based on the information on the object, the determined optimal holding orientation and the determined optimal movement.

In one embodiment, the plurality of suction cups are identified as the one or more optimal grasping components to grasp the object based on (i) a suction provided by the actuator and (ii) a determination of centre of gravity on the object, wherein the centre of gravity on the object is determined by the hardware processor based on the captured information. In one embodiment, the centre of gravity on the object is determined by the hardware processor based on the determined optimal holding orientation and the determined optimal movement.

In another aspect, a method is provided. The method comprises capturing, using an electronic device, information of an object, wherein the information of the object is indicative of holding position; determining, using the information, by a hardware processor, an optimal holding orientation and an optimal movement of at least one of (i) a plurality of fingers, or (ii) a plurality of suction cups of a gripper device based on the captured information obtained from the electronic device; identifying the at least one of (i) the plurality of fingers, and (ii) the plurality of suction cups as one or more grasping components based on the information, the optimal holding orientation and the optimal movement; and enabling, using an actuator, the one or more identified grasping components to grasp the object based on the information, the optimal holding orientation and the optimal movement. In one embodiment, the plurality of suction cups are identified as the one or more optimal grasping components to grasp the object based on (i) a suction provided by the actuator and (ii) a determination of centre of gravity on the object by the hardware processor. In one embodiment, a sliding finger of the plurality of fingers is configured to move from a first position to a second position based on position and dimension of the object.

In yet another aspect, one or more non-transitory machine readable information storage mediums comprising one or more instructions is provided. The one or more instructions which when executed by one or more hardware processors causes (i) capturing, using an electronic device, information of an object, wherein the information of the object is indicative of holding position; determining, using the captured information, by the one or more hardware processors, an optimal holding orientation and an optimal movement of at least one of (i) a plurality of fingers, or (ii) a plurality of suction cups of a gripper device; identifying, by the one or more hardware processors, the at least one of (i) the plurality of fingers, and (ii) the plurality of suction cups as one or more grasping components based on the information, the optimal holding orientation and the optimal movement; and enabling, by the one or more hardware processors, using an actuator, the one or more identified grasping components to grasp the object based on the information, the optimal holding orientation and the optimal movement. In one embodiment, the plurality of suction cups are identified as the one or more optimal grasping components to grasp the object based on (i) a suction provided by the actuator and (ii) a determination of centre of gravity on the object by the hardware processor. In one embodiment, a sliding finger of the plurality of fingers is configured to move from a first position to a second position based on position and dimension of the object.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Referring now to the drawings, and more particularly to FIGS. 1 through 6, where similar reference characters denote corresponding features consistently throughout the figures, there are shown preferred embodiments and these embodiments are described in the context of the following exemplary system and/or method.

Figure 1:
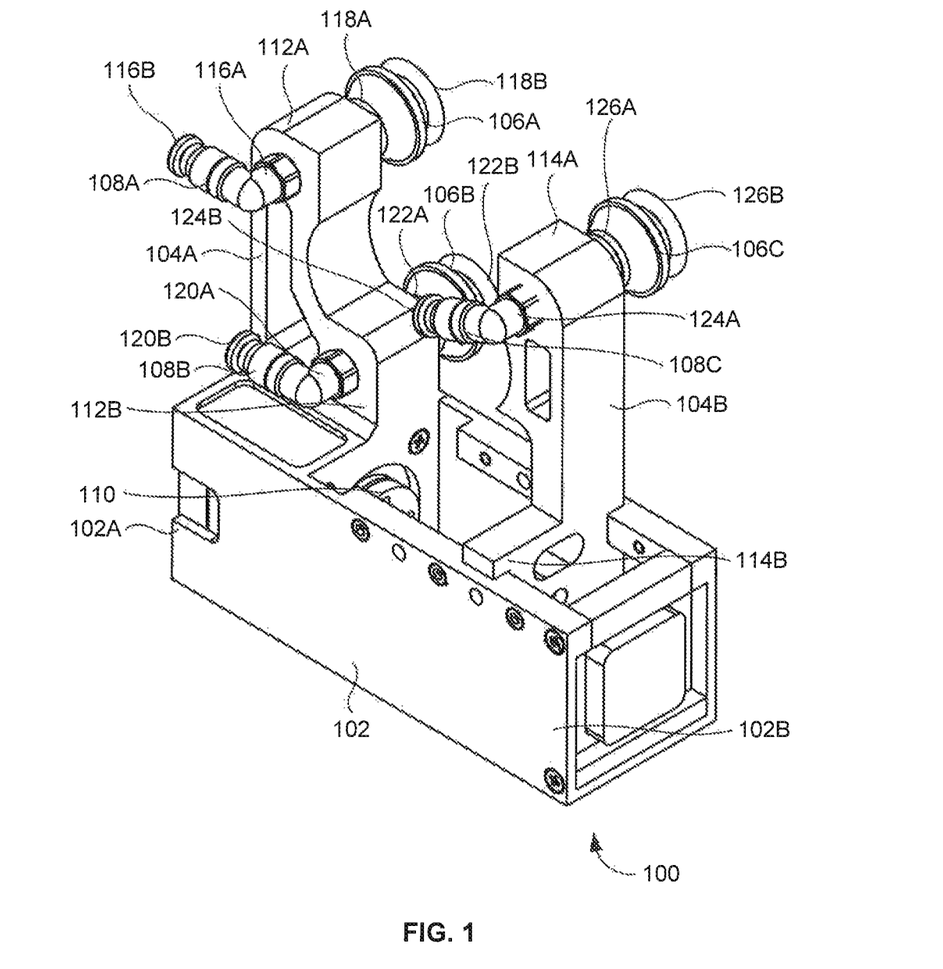
FIG. 1 illustrates a perspective view of an adaptive gripper device according to an embodiment of the present disclosure.

FIG. 1 illustrates a perspective view of an adaptive gripper device 100 according to an embodiment of the present disclosure. The adaptive gripper device 100 (also hereinafter referred as "gripper device 100" or device 100). The gripper device 100 comprises a base 102, a plurality of fingers 104A-B, a plurality of suction cups 106A-C, a plurality of push-in fittings 108A-C, and an actuator 110. The base 102 comprises a first end 102A and a second end 102B. A first finger 104A from the plurality of fingers 104A-B comprises a top end 112A and a bottom end 112B. In one embodiment, the first finger 112A is a fixed finger, wherein the bottom end 112B of the fixed finger 112A is coupled (or fixed) to the first end 102A of the base 102. In one embodiment, a second finger 104B of the plurality of fingers 104A-B comprises a first end 114A and a second end 114B. In one embodiment, the second finger 104B is a sliding finger, wherein the bottom end 114B of the sliding finger 104B is positioned at the second end 102B of the base 102 such that the sliding finger 104B faces towards, and is opposite to, the fixed finger 104A. The sliding finger 104B is configured to move (and/or slide) from the second end 102B of the base 102 to the first end 102A of the base 102 and back to a desired position respectively. Although FIG. 1 depicts only two fingers, it is to be understood to a person having ordinary skill in the art that there could be more than two fingers comprised in the gripper device 100. In one embodiment, the sliding finger 104B is configured to move from a first position to a second position based on position and dimension of an object to be grasped. A first suction cup 106A of the plurality of suction cups 106A-C is attached to the fixed finger 104A such that the first suction cup 106A is in close proximity of the top end 112A of the fixed finger 104A. Similarly, a second suction cup 106B from the plurality of suction cups 106A-C is attached to the fixed finger 104A such that the second suction cup 106B is in close proximity of the bottom end 112B of the fixed finger 104A. Similarly, a third suction cup 106C from the plurality of suction cups 106A-C is attached between the first end 114A and the second end 114B of the sliding finger 104B. Although FIG. 1 depicts only three suction cups, it is to be understood to a person having ordinary skill in the art that there could be more than three suction cups comprised in the gripper device 100.

Each of the fingers 104A-B comprise a hole (not shown in FIG. 1) that is configured to accommodate a push-in fitting on a first side, and a suction cup on another side of the hole. For example, as depicted in FIG. 1, the fixed finger 104A comprises a hole (not shown in FIG. 1) that is adapted to accommodate a first push-in fitting 108A such that a first end 116A of the first push-in fitting 108A is connected to a first end 118A of the first suction cup 106A through the hole via a fixing means (also referred hereinafter fixing component). Similarly, the fixed finger 104A comprises another hole (not shown in FIG. 1) that is adapted to accommodate a second push-in fitting 108B such that a first end 120A of the second push-in fitting 108B is connected to a first end 122A of the second suction cup 106B through the another hole via a fixing means. Similarly, the sliding finger 104B comprises a hole (not shown in FIG. 1) that is adapted to accommodate a third push-in fitting 108C such that a first end 124A of the first push-in fitting 108C is connected to a first end 126A of the third suction cup 106A through a corresponding hole via a fixing means. The other ends (the second end 116B, the second end 120B, and the second 124B) of the push-in fittings 108A-C are connected to corresponding pipes (e.g., suction pipes) that provide suction to corresponding suction cups 106A-C using one or more suction providers. In one embodiment, the gripper device 100 implements one or more solenoids to control the suction cups 106A-C for gripping and releasing of objects.

Figure 5A:
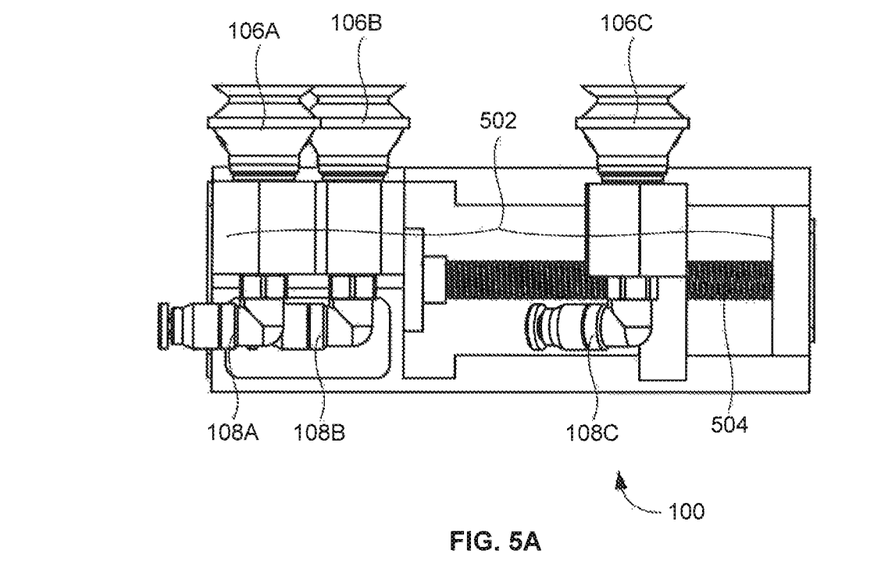
FIG. 5A illustrates a top view of the adaptive gripper device of FIG. 1 according to an embodiment of the present disclosure.

The actuator 110 may comprise any of a lead screw mechanism, a pneumatic mechanism, a hydraulic mechanism, and the like. In an example embodiment, the actuator 110 comprises a lead screw mechanism is depicted in FIG. 5A. The second end 114B of the sliding finger 104B is coupled to (or attached to) the lead screw mechanism such that when the actuator is activated, the screw of the lead screw mechanism drives the sliding finger to either sides of the base 102. When the actuator 110 comprises a mechanism other than lead screw mechanism, the actuator 100 enables the sliding finger 104B to slide or move on either sides of the base 102.

The gripper device 100 further comprises an electronic device (not shown in FIG. 1), a memory (not shown in FIG. 1), a hardware processor (not shown in FIG. 1), and an input/output (I/O) interface (not shown in FIG. 1). The electronic device, the memory, the hardware processor may be either integrated within the gripper device 100, or connected to the gripper device 100 through an external interfaces. It may be understood that one or more memory units, one or more hardware processors, and/or one or more communication interfaces may be comprised in the gripper device 100. The electronic device may be an image capturing device, a laser device, a depth camera, and the like. The electronic device, the memory, the hardware processor, and the input/output (I/O) interface may be coupled by a system bus or a similar mechanism.

The memory, may store instructions, any number of pieces of information, and data (e.g., depth information, image associated with an object to be grasped, or object information), captured by the electronic device, for example to implement the functions of the device 100. The memory may include for example, volatile memory and/or non-volatile memory. Examples of volatile memory may include, but are not limited to volatile random access memory (RAM). The non-volatile memory may additionally or alternatively comprise an electrically erasable programmable read only memory (EEPROM), flash memory, hard drive, or the like. Some examples of the volatile memory includes, but are not limited to, random access memory, dynamic random access memory, static random access memory, and the like. Some example of the non-volatile memory includes, but are not limited to, hard disks, magnetic tapes, optical disks, programmable read only memory, erasable programmable read only memory, electrically erasable programmable read only memory, flash memory, and the like. The memory 102 may be configured to store information, data, instructions or the like for enabling the device 100 to carry out various functions in accordance with various example embodiments.

Additionally or alternatively, the memory may be configured to store instructions which when executed by the hardware processor causes the gripper device 100 to behave in a manner as described in various embodiments. The memory stores the functional modules and information, for example, information (e.g., proximity information of object from (i) the fingers 104A-B, and/or the suction cups 106A-C) received from the one or more proximity sensors (not shown in FIG. 1). The proximity sensors may be attached to the gripper device 100 and are configured to determine the proximity of the object (e.g., position and/or distance of the object) from (i) the fingers 104A-B, and/or the suction cups 106A-C. In one embodiment, the one or more proximity sensors are attached to (or fixed to) each of the inward layers of the fingers 104A-B. Similarly, the one or more proximity sensors may be attached to (or fixed to) the surfaces of each of suction cups 106A-C. In one embodiment, the suction cups 106A-C may be positioned on the fingers 104A-B such that proximity sensors on the surfaces of the suction cups 106A-C determine the proximity of the object (e.g., position and/or distance of the object) from the suction cups 106A-C.

The hardware processor may be implemented as one or more microprocessors, microcontrollers, digital signal processors, central processing units, state machines, logic circuitries, and/or any devices that manipulate signals based on operational instructions. Further, the hardware processor may comprise a multi-core architecture. Among other capabilities, the hardware processor is configured to fetch and execute machine-readable instructions or modules stored in the memory. The hardware processor may include circuitry implementing, among others, audio and logic functions associated with the communication. For example, the hardware processor may include, but are not limited to, one or more digital signal processors (DSPs), one or more microprocessor, one or more special-purpose machine chips, one or more field-programmable gate arrays (FPGAs), one or more application-specific integrated circuits (ASICs), one or more machine(s), various analog to digital converters, digital to analog converters, and/or other support circuits.

The hardware processor thus may also include the functionality to encode messages and/or data or information. The hardware processor may include, among others a clock, an arithmetic logic unit (ALU) and logic gates configured to support operation of the hardware processor. Further, the hardware processor may include functionality to execute one or more software programs, which may be stored in the memory or otherwise accessible to the hardware processor.

Figure 2A:
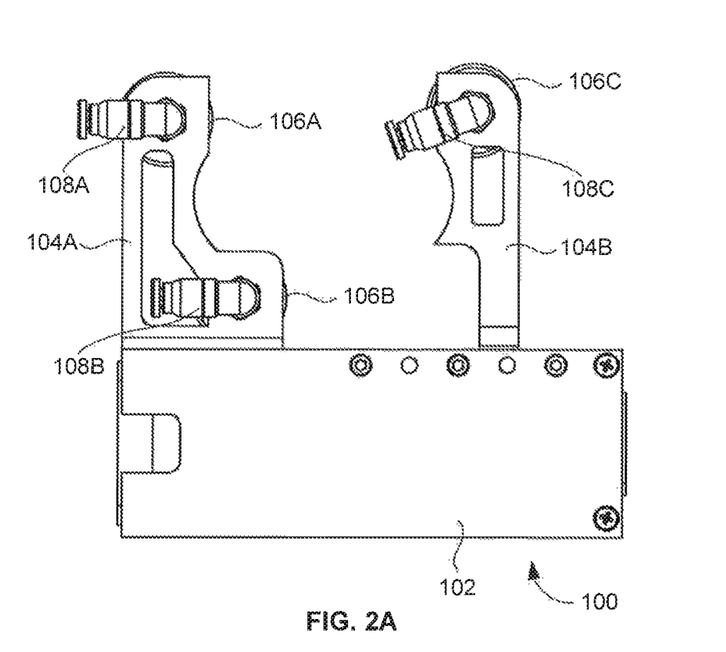
FIGS. 2A-2B illustrates a front view of the adaptive gripper device of FIG. 1 according to an embodiment of the present disclosure.
Figure 2B:
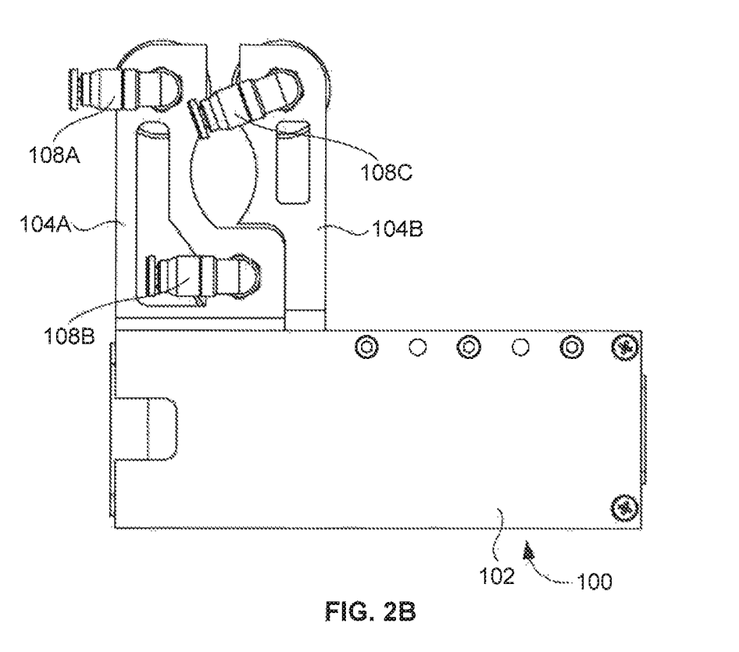
Figure 3:
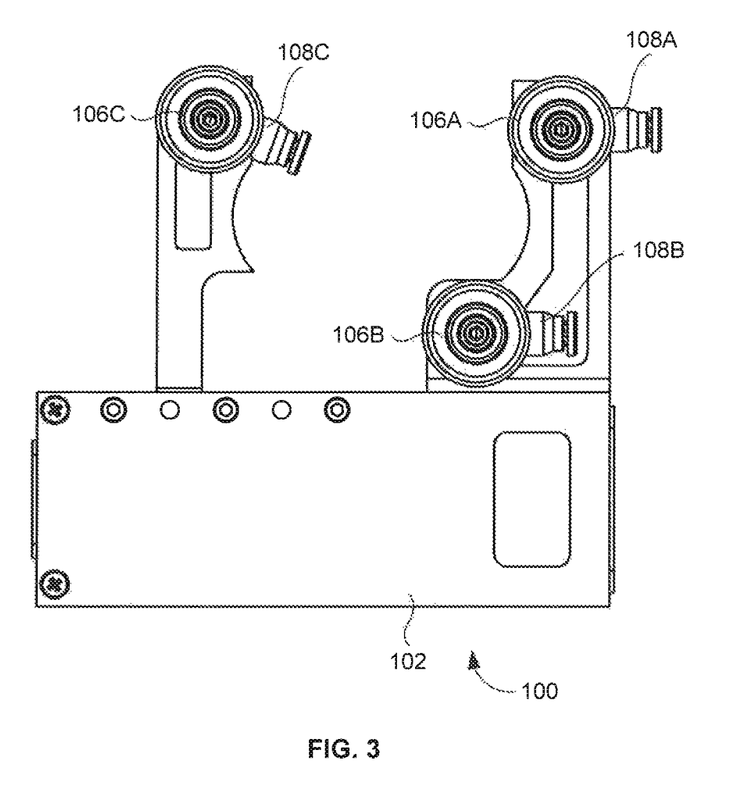
FIG. 3 illustrates a rear view of the adaptive gripper device of FIG. 1 according to an embodiment of the present disclosure.
Figure 4A:
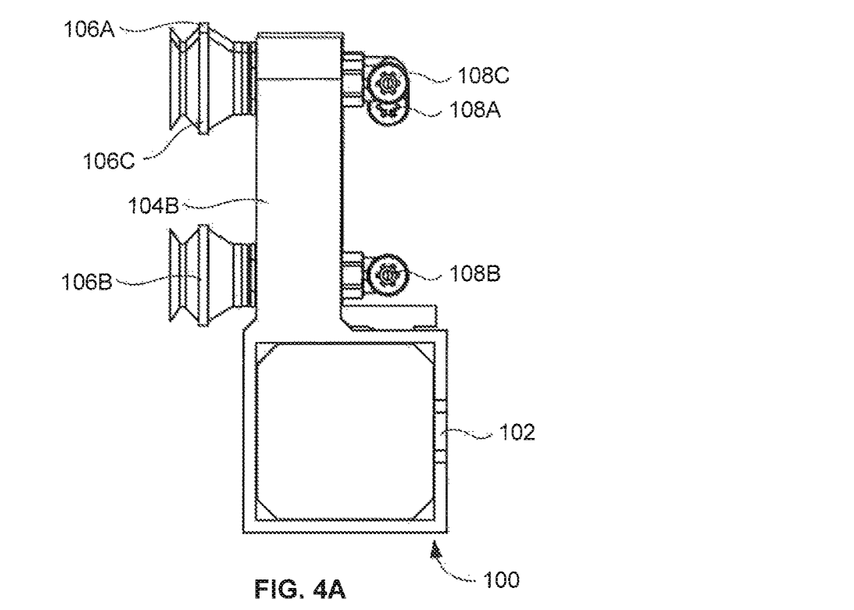
FIGS. 4A-4B illustrate side views of the adaptive gripper device of FIG. 1 according to an embodiment of the present disclosure.
Figure 4B:
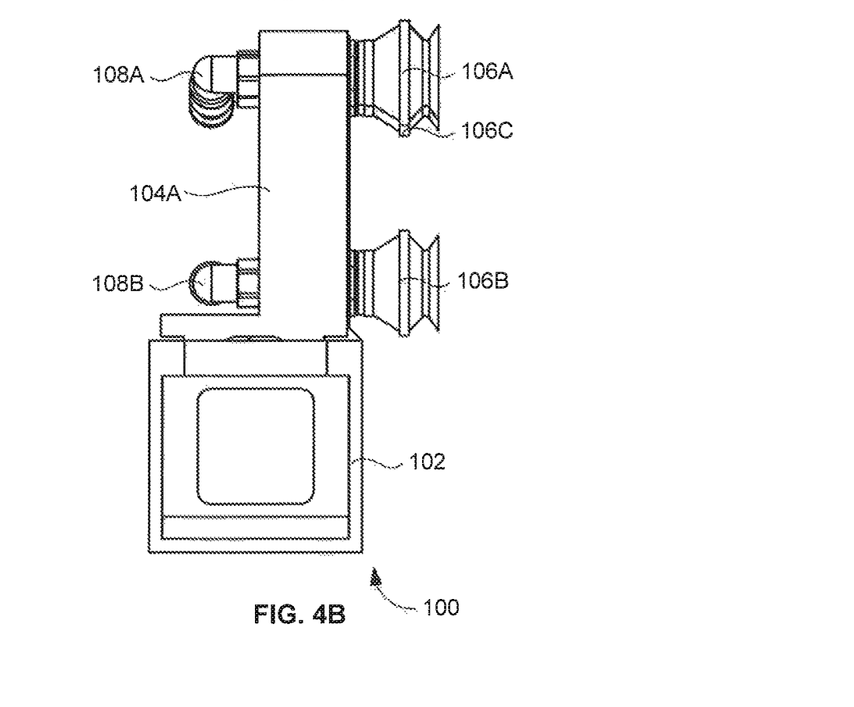
Figure 5B:
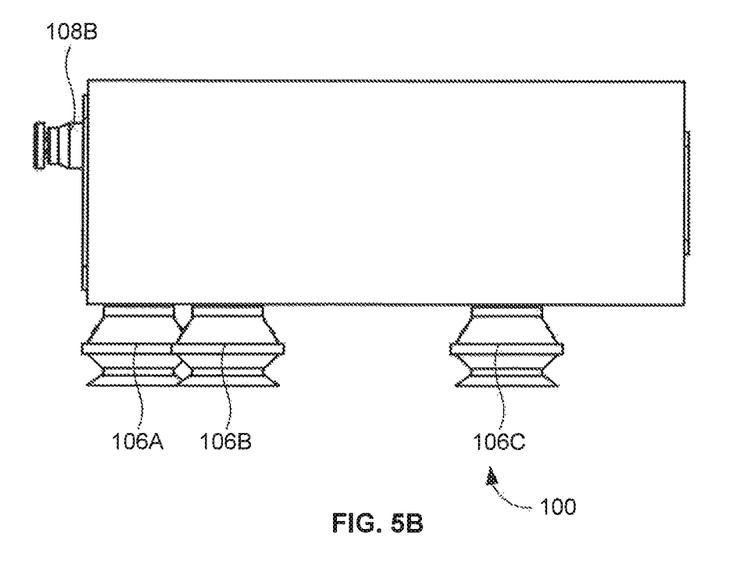
FIG. 5B illustrates a bottom view of the adaptive gripper device of FIG. 1 according to an embodiment of the present disclosure.

FIGS. 2A-2B, with reference to FIG. 1, illustrates a front view of the adaptive gripper device 100 according to an embodiment of the present disclosure. More particularly, FIG. 2A depicts the fingers 104A-B in an open mode and FIG. 2B depicts the fingers 104A-B in a closed mode according to an embodiment of the present disclosure. FIG. 3, with reference to FIGS. 1 through 2B, illustrates a rear view of the adaptive gripper device 100 according to an embodiment of the present disclosure. FIGS. 4A-4B, with reference to FIGS. 1 through 3, illustrate side views of the adaptive gripper device 100 according to an embodiment of the present disclosure. More particularly, FIG. 4A illustrates a left side view of the adaptive gripper device 100 and FIG. 4B illustrates a right side view of the adaptive gripper device 100 according to an embodiment of the present disclosure. FIG. 5A, with reference to FIGS. 1 through 4, illustrates a top view of the adaptive gripper device 100 according to an embodiment of the present disclosure. More particularly, FIG. 5A illustrates a top view of the adaptive gripper device 100 depicting the actuator 110 comprising a lead screw mechanism 502 according to an example embodiment of the present disclosure. The lead screw mechanism 502 comprises a screw 504 that enables the sliding finger 104B to slide from one end to another end of the base 102 (e.g., enable the sliding finger 104B to move towards fixed finger 104A and/or away from the fixed finger 104A in the opposite direction). FIG. 5B, with reference to FIGS. 1 through 5A, illustrates a bottom view of the adaptive gripper device 100 according to an embodiment of the present disclosure.

Figure 6:
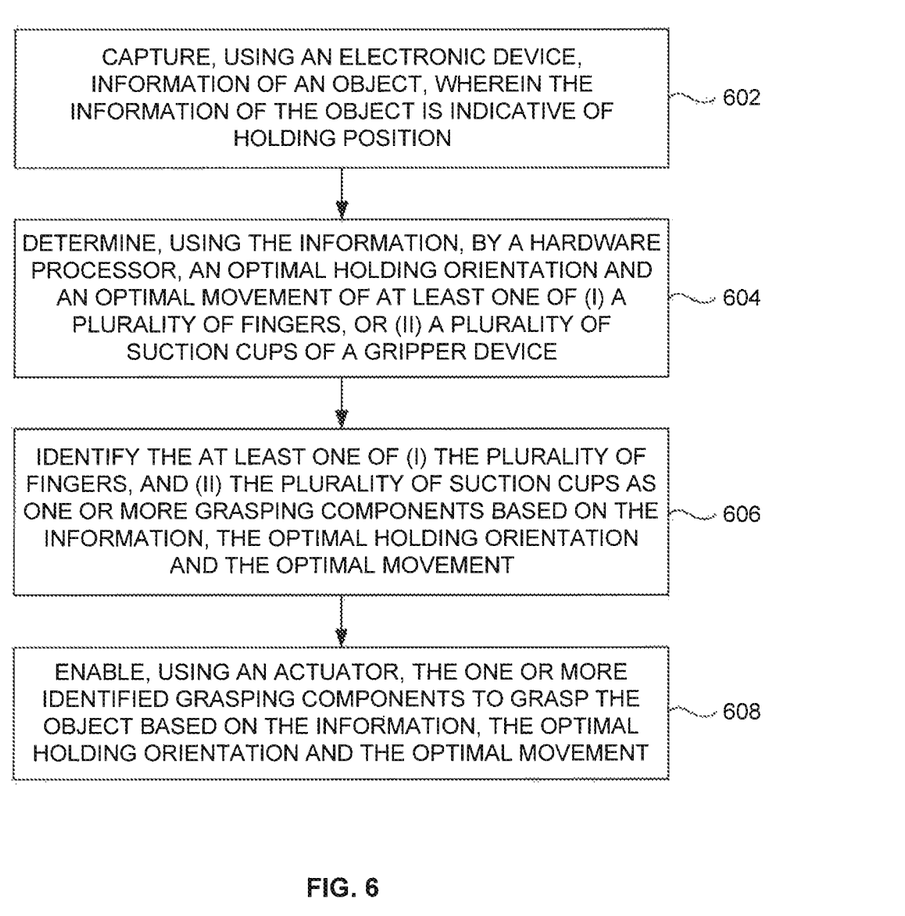
FIG. 6 is a flow diagram illustrating a processor implemented method using the adaptive gripper device of FIG. 1 according to an embodiment of the present disclosure.

FIG. 6, with reference to FIGS. 1 through 5B, is a flow diagram illustrating a processor implemented method using the adaptive gripper device 100 of FIG. 1 according to an embodiment of the present disclosure. The steps of the method of the present disclosure will now be explained with reference to the components of the gripper device 100 as depicted in FIG. 1. The hardware processor is configured by the instructions stored in the memory. The hardware processor when configured by the instructions enables the gripper device 100 to function in a particular manner as described hereinafter. At step 602, the hardware processor enables the electronic device (integrated into or attached to the gripper device 100) to capture information of an object (or objects) to be grasped. In one embodiment, the captured information is indicative of holding position of the object. In another embodiment, the captured information may comprise depth information of the object, or any such information that is indicative of size, shape, and dimension of the object. At step 604, the hardware processor determines an optimal holding orientation and an optimal movement of at least one of (i) the plurality of fingers 104A-B, and/or (ii) the plurality of suction cups 106A-C based on the captured information obtained from the electronic device. At step 606, the hardware processor identifies at least one of (i) the plurality of fingers 104A-B, and (ii) the plurality of suction cups 106A-C as one or more optimal grasping components based on the captured information on the object, the determined optimal holding orientation and the determined optimal movement. At step 608, the hardware processor with the help of the actuator 110 enables the one or more identified grasping components to grasp the object based on the information, the optimal holding orientation and the optimal movement. In one embodiment, the one or more identified grasping components perform pick and place function for objects in a particular orientation and/or particular movement/direction based on the determined optimal holding orientation and the determined optimal movement. This ensures that the gripper device 100 grips the objects firmly and ensures that the object does not fall and is rather grasped (or held) tightly. In one embodiment, the plurality of suction cups 106A-C are identified as the one or more optimal grasping components to grasp the object based on (i) the suction provided by suction provider or by the actuator 110 and (ii) a determination of centre of gravity on the object. The centre of gravity on the object may be determined by the hardware processor based on the captured information.

The embodiments of the present disclosure provide an adaptive gripper device 100 that addresses problems/limitations in conventional gripping systems. Unlike conventional gripping systems, the proposed gripper device 100 is adapted to grasp different objects with different combinations of picking and placing them by implementing proximity sensors, electronic device(s) that identifies shape(s), orientation(s) of the object and intelligently identifies at least one of (i) the plurality of fingers 104A-B, and (ii) the plurality of suction cups 106A-C as one or more optimal grasping components based on the captured information on the object, the determined optimal holding orientation and the determined optimal movement.

Further, the embodiments of the present disclosure provide dynamic movement of the suction cups 106A-C which help in positioning the suction cups with different orientations based on the object (or properties of the object). The position of the fingers 104A-B, and the position of the suction cups 106A-C enable different types of triangular formations which helps to hold the objects and avoid the problem of centre of gravity on the object. Unlike conventional gripping systems which lack in determining sensitivity of object(s), the embodiments of the present disclosure enable the gripper device 100 to identify the object shape and position of holding and maintain the gripping force based on the sensitivity of the object. When the suction cups 106A-C are identified as the one or more grasping components, each of the suction cups 106A-C are continually provided with suction. This ensures that even when a particular suction cup fails to grip (or hold or grasp) a certain part of the object during a particular orientation and/or movement in a direction, that particular suction cup may at any moment attempt to grip that certain part of the object when the orientation and/or movement (or direction) of the gripper device 100 changes (based on intelligent decision making abilities of the hardware processor). For example, the gripper device 100 (or the hardware processor) may transmit a signal to attempt gripping of that certain part of the object when an appropriate orientation and/or movement (or angle) is observed. In other words, while an object is being grasped, a second suction cup 106B fails to grip a part (e.g., curve part) of the object during a first orientation and/or first movement (or first direction). When the gripper device 100 continues to move and detects a second orientation and/or a second movement (or second direction), the gripper device 100 may transmit a signal to the suction cup 106B requesting to attempt to grip (or requesting to grasp or grip) that curve part of the object (where the suction cup previously failed to grip the object). This signal transmission may be either based on the captured information or object information being captured in real-time (using the electronic device) during real-time orientation, and/or real-time movement of the gripper device 100. This enables the gripper device 100 to ensure that objects are properly gripped (or tightly gripped) and do not fall out during orientation(s) and/or movement(s) in one or more direction(s) as can be observed in conventional (or traditional) gripping systems.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a machine-readable means having a message therein; such machine-readable storage means contain program-code means for implementation of one or more steps of the method, when the program runs on a machine or any suitable programmable device (e.g., the gripper device 100). The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a machine-usable or machine readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more machine-readable storage media may be utilized in implementing embodiments consistent with the present disclosure. A machine-readable storage medium refers to any type of physical memory on which information or data readable by a processor may be stored. Thus, a machine-readable storage medium may store instructions for execution by one or more processors, including instructions for causing the processor(s) to perform steps or stages consistent with the embodiments described herein. The term machine-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, BLU-RAYs, DVDs, flash drives, disks, and any other known physical storage media.

It is intended that the disclosure and examples be considered as exemplary only, with a true scope and spirit of disclosed embodiments being indicated by the following claims.

What is claimed is:

1. A gripper device, comprising:
  a base comprising a first end and a second end;
  a plurality of fingers, wherein a first finger comprising a top end and a bottom end, wherein said bottom end of said first finger is fixed to said first end of said base, a second finger comprising a top end and a bottom end, wherein said bottom end of said second finger is positioned at said second end of said base and opposite to said first finger such that said second finger is configured to slide from said second end of said base to said first end of said base;
  a plurality of suction cups, wherein a first suction cup is attached to said first finger such that said first suction cup is in close proximity of said top end of said first finger, wherein a second suction cup is attached to said first finger such that said second suction cup is in close proximity of said bottom end of said first finger, and wherein a third suction cup is attached between said first end and said second end of said second finger, wherein said first suction cup, said second suction cup, and said third suction cup form the edges of an imaginary triangle, while holding an object to be grasped;
  an electronic device that is configured to capture information of said object to be grasped, wherein said information is indicative of holding position of said object; and
  a hardware processor is configured to
    determine an optimal holding orientation and an optimal movement of at least one of (i) said plurality of fingers, or (ii) said plurality of suction cups based on the captured information obtained from the electronic device, and
    identify said at least one of (i) said plurality of fingers, or (ii) said plurality of suction cups as one or more optimal grasping components based on said information on said object, said determined optimal holding orientation and said determined optimal movement; wherein said plurality of suction cups are identified as said one or more optimal grasping components and said plurality of suction cups are configured to grasp said object based on (i) a suction provided by an actuator based on at least one of a real-time orientation or a real-time movement of the gripper device and (ii) a determination of center of gravity on said object.

2. The gripper device of claim 1, further comprising one or more proximity sensors configured to detect position of said object from said plurality of fingers.

3. The gripper device of claim 1, further comprising an actuator that is configured to enable said one or more optimal grasping components to grasp said object based on said information on said object, said determined optimal holding orientation and said determined optimal movement.

4. A method, comprising:
  capturing, using an electronic device, information about size, shape, dimension and depth of an object, wherein said information of said object is indicative of holding position;
  capturing, using one or more proximity sensors, information about proximity and position of said object from at least one of (i) a plurality of fingers of a gripper device, or (ii) a plurality of suction cups positioned on said plurality of fingers;
    wherein said plurality of fingers, further comprises:
      a first finger comprising a top end and a bottom end, wherein said bottom end of said first finger is fixed to a first end of a base; and a second finger comprising a top end and a bottom end, wherein said bottom end of said second finger is positioned at a second end of a base and opposite to said first finger such that said second finger is configured to slide from said second end of said base to said first end of said base;
    wherein said plurality of suction cups, further comprises:
      a first suction cup attached to said first finger such that said first suction cup is in close proximity of said top end of said first finger;
      a second suction cup attached to said first finger such that said second suction cup is in close proximity of said bottom end of said first finger; and
      a third suction cup attached between said first end and said second end of said second finger, wherein said first suction cup, said second suction cup, and said third suction cup form the edges of an imaginary triangle, while holding the object to be grasped;
  determining, using said captured information, by a hardware processor, an optimal holding orientation and an optimal movement of at least one of (i) said plurality of fingers, or (ii) said plurality of suction cups;
  identifying said at least one of (i) said plurality of fingers, and (ii) said plurality of suction cups as one or more grasping components based on said information, said optimal holding orientation and said optimal movement; wherein said plurality of suction cups are identified as said one or more optimal grasping components and said plurality of suction cups are configured to grasp said object based on (i) a suction provided by an actuator based on at least one of a real-time orientation or a real-time movement of the gripper device and (ii) a determination of center of gravity on said object; and enabling, using an actuator, said one or more identified grasping components to grasp said object based on said information, said optimal holding orientation and said optimal movement.

* * * * *